United States Patent
Haas et al.

(10) Patent No.: US 7,652,801 B2
(45) Date of Patent: Jan. 26, 2010

(54) DUPLEX DETECTION IMAGING SYSTEM AND METHOD

(75) Inventors: William Robert Haas, Fort Collins, CO (US); Kirk Steven Tecu, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1024 days.

(21) Appl. No.: 10/860,202

(22) Filed: Jun. 3, 2004

(65) Prior Publication Data

US 2005/0270591 A1      Dec. 8, 2005

(51) Int. Cl.
    *H04N 1/04*     (2006.01)
(52) U.S. Cl. .................. 358/474; 358/505; 358/496; 358/497
(58) Field of Classification Search .............. 358/474, 358/505, 496, 497, 498, 475, 482, 483, 484, 358/509, 513, 514, 448; 250/208.1; 399/374; 235/462.25
    See application file for complete search history.

(56) References Cited

U.S. PATENT DOCUMENTS

| | | | |
|---|---|---|---|
| 4,248,528 A * | 2/1981 | Sahay | 399/84 |
| 4,956,547 A * | 9/1990 | Mita | 250/208.1 |
| 5,005,049 A | 4/1991 | Matsushita | |
| 5,038,182 A | 8/1991 | Tanimoto | |
| 5,347,351 A | 9/1994 | Morita et al. | |
| 5,412,485 A * | 5/1995 | Kashiwagi | 358/448 |
| 5,463,451 A * | 10/1995 | Acquaviva et al. | 399/211 |
| 5,488,485 A * | 1/1996 | Amemiya | 358/498 |
| 5,502,542 A | 3/1996 | Takano | |
| 5,598,271 A | 1/1997 | Ohtani | |
| 5,634,187 A | 5/1997 | Ross | |
| 5,703,693 A | 12/1997 | Morikawa | |
| 5,947,464 A | 9/1999 | Takada | |
| 6,169,873 B1 | 1/2001 | Connolly | |
| 6,176,429 B1 * | 1/2001 | Reddersen et al. | 235/462.25 |
| 6,211,508 B1 * | 4/2001 | Liu | 250/208.1 |
| 6,321,136 B1 | 11/2001 | Faguy et al. | |
| 6,362,870 B2 | 3/2002 | Mui et al. | |
| 6,393,251 B2 | 5/2002 | Kono | |
| 6,505,778 B1 * | 1/2003 | Reddersen et al. | 235/462.25 |
| 6,995,880 B2 * | 2/2006 | Tohyama et al. | 358/496 |
| 7,019,873 B2 * | 3/2006 | Tohyama et al. | 358/496 |
| 7,027,194 B2 * | 4/2006 | Kanda | 358/496 |
| 7,034,969 B2 * | 4/2006 | Watanabe | 358/513 |
| 2007/0091388 A1 * | 4/2007 | Tanaka | 358/498 |

FOREIGN PATENT DOCUMENTS

| | | |
|---|---|---|
| JP | 2157837 | 6/1990 |
| JP | 9298632 | 11/1997 |
| JP | 10336382 | 12/1998 |
| JP | 2003295348 | 10/2003 |

\* cited by examiner

*Primary Examiner*—Houshang Safaipour

(57) ABSTRACT

A duplex detection imaging system comprises a scanning device having a photosensitive element disposed therein for receiving light reflected from a front surface of a document. The photosensitive element is also adapted to receive light reflected from a back surface of the document while the front surface of the document is oriented toward the photosensitive element for determining whether an image resides on the back surface of the document.

33 Claims, 5 Drawing Sheets

DUPLEX DETECTION IMAGING SYSTEM AND METHOD

TECHNICAL FIELD

This invention relates to imaging systems and, more particularly, to a duplex detection imaging system and method.

BACKGROUND

Document scanners convert a visible image on a document, photograph, a transparent media and the like into an electronic form suitable for copying, storing and processing by a computer. A document scanner may be a stand-alone device or integrated with a copier, a facsimile machine, a multipurpose device, a printer or another imaging apparatus.

Scanners are typically stationary devices which have a transparent plate or platen against which an object to be scanned, such as a paper document, is placed. The document is scanned by sequentially imaging narrow strips, or scan lines, of the document using an optical sensor or photosensitive element such as a charge coupled device (CCD) array. The optical sensor produces electronic data which is representative of each scan line.

In one type of scanner, the current scan line portion of the document which is imaged on the sensor array is changed, or "swept," by moving the platen supporting the document relative to the scanner imaging assembly. In another type of scanner, the platen and document remain stationary and at least a portion of an imaging assembly is moved to change the scan line portion which is currently imaged. An automatic document feeder (ADF) device may also be integrated with a scanner which sequentially moves documents across a portion of the scanner platen.

Scanner systems featuring an ADF provide scanning of dual-sided media by imaging a first side of a document during a first passage of the document across the scanner platen and subsequently reversing, or flipping, the document and imaging a second side of the document during a second document passage across the scanner platen. Scanner systems featuring an ADF may also be configured to automatically detect and initiate duplex scanning operations when an image is detected on both sides of a document.

Some scanning systems configured to automatically detect and initiate duplex scanning operations comprise secondary sensors or photosensitive elements incorporated into the ADF to determine whether an image resides on the back surface of the document. Based on data acquired by the secondary sensors, the scanning system may be configured to automatically initiate duplex scanning if a back surface image is detected. However, incorporating additional sensing or photosensitive elements into the ADF generally increases the manufacturing cost associated with the scanning system. Additionally, integrating the secondary photosensitive elements with the assortment of rollers and document feed paths to obtain duplex scanning operations is complex and time-consuming.

SUMMARY

In accordance with an embodiment of the present invention, a duplex detection imaging system comprises a scanning device having a photosensitive element disposed therein for receiving light reflected from a front surface of a document. The photosensitive element is also adapted to receive light reflected from a back surface of the document while the front surface of the document is oriented toward the photosensitive element for determining whether an image resides on the back surface of the document.

In accordance with another embodiment of the present invention, a duplex detection imaging method comprises receiving light reflected from a front surface of the document onto a photosensitive element of a scanning device. The method also comprises receiving light reflected from a back surface of the document onto the photosensitive element of the scanning device while the front surface of the document is oriented toward the photosensitive element to determine whether an image resides on the back surface of the document.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiments of the present invention are best understood by referring to FIGS. 1 through 5 of the drawings, like numerals being used for like and corresponding parts of the various drawings.

Figure 1:
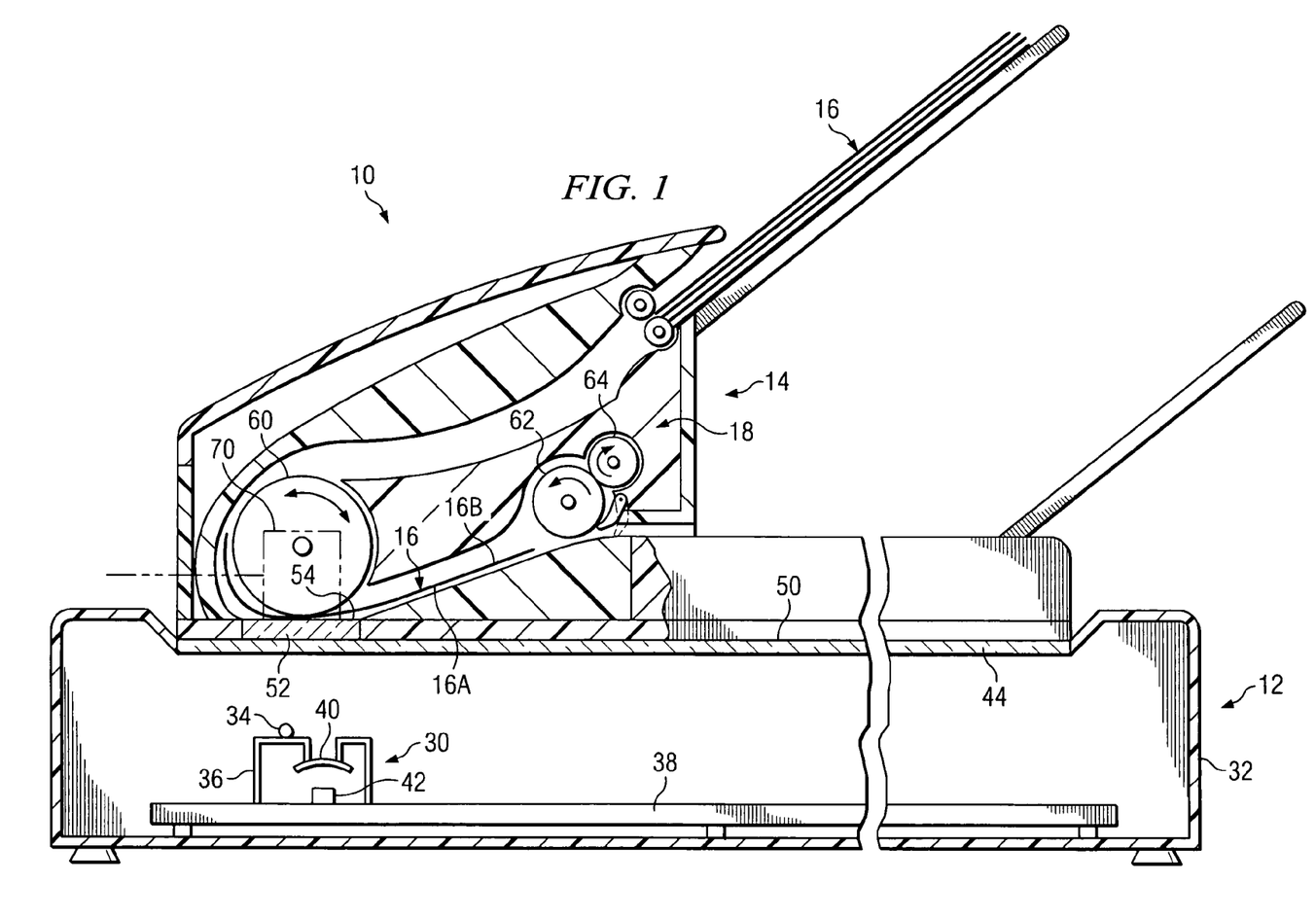
FIG. 1 is a diagram illustrating an embodiment of a duplex detection imaging system in accordance with the present invention.

FIG. 1 is a diagram illustrating an embodiment of a duplex detection imaging system 10 in accordance with the present invention. In the embodiment illustrated in FIG. 1, system 10 comprises a scanning device 12 and an automatic document feeder (ADF) 14. Scanning device 12 may comprise any type of device for performing a scanning operation to acquire and/or generate an image of a document such as, but not limited to, a scanner, copier, printer or facsimile device. ADF 14 comprises any device for automatically feeding a document 16 to scanning device 12. Document 16 may comprise any type of media object such as, but not limited to, a photograph, periodical, or any other type of object having text, graphics, or other types of visual content. System 10 may also be configured to accommodate a variety of sizes and types of document(s) 16 such as, but not limited to, 8½×11 inch objects of a variety of types of media. Preferably, ADF 14 is configured having a feed assembly 18 adapted to flip and/or reverse feed a document 16 to accommodate automatic scanning of both sides of document 16. However, it should also be understood that ADF 14 may be configured for simplex feeding such that a user of system 10 may be notified and/or prompted to manually flip and/or reverse feed document 16 upon a determination that an image resides on both surfaces of document 16.

In the embodiment illustrated in FIG. 1, scanning device 12 comprises a photosensitive assembly 30 disposed within a housing 32 of scanning device 12 having an internal light source 34 attached to a carriage 36. Carriage 36 is adapted to impart a linear motion of photosensitive assembly 30 along a rail 38 or other type of guide structure. In the embodiment illustrated in FIG. 1, photosensitive assembly 30 also comprises a lens assembly 40 and a photosensitive element 42. Lens assembly 40 may comprise a lens assemblage, a mirror assemblage, and/or another device for focusing light onto photosensitive element 42. Photosensitive element 42 may comprise any type of photosensitive device such as, but not limited to, a charge coupled device (CCD) array. Scanning device 12 also comprises a platen 44 for supporting document 16 during a scanning operation.

In the embodiment illustrated in FIG. 1, ADF 14 comprises a generally flat extending surface 50 to accommodate interfacing with platen 44 of scanning device 12. As illustrated in FIG. 1, ADF 14 also comprises a window 52 through which a document 16 to be scanned can be imaged by scanning device 12. In some embodiments of the present invention, a transparent pane 54 constructed from mylar or another suitable transparent material is disposed over window 52 between document 16 and platen 44 to enable recovery and/or ejection of document 16 from ADF 14. However, it should be understood that in other embodiments, window 52 may remain open or uncovered. In the embodiment illustrated in FIG. 1, ADF 14 also comprises rollers 60, 62 and 64 for feeding document(s) 16 toward scanning device 12 such that a front surface 16A is disposed toward scanning device 12 and/or to facilitate flipping or turning of document(s) 16 for duplex feeding of document(s) 16.

Figure 2:
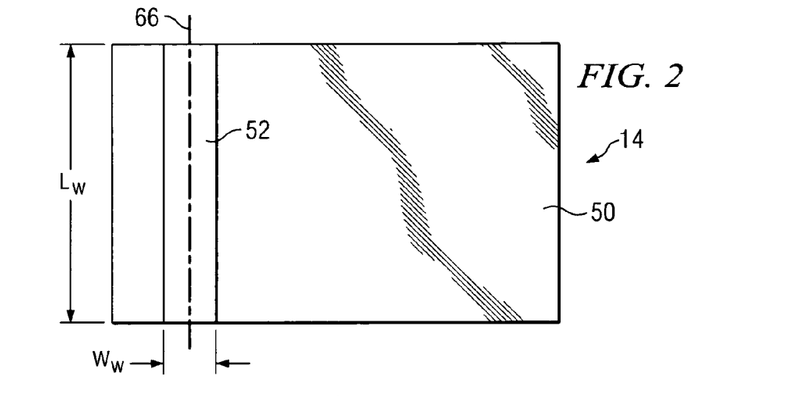
FIG. 2 is a diagram illustrating a bottom view of an embodiment of an automatic document feeder of the duplex detection imaging system illustrated in FIG. 1.

FIG. 2 is a diagram illustrating a bottom view of ADF 14 illustrated in FIG. 1. In the embodiment illustrated in FIG. 2, window 52 is sized having a length ($L_W$) as measured along a transverse axis 66 of ADF 14 and a longitudinal width ($W_W$) to accommodate scanning of document 16 as document 16 moves past window 52 and while photosensitive assembly 30 remains substantially stationary. However, it should be understood that window 52 may also be sized having a width and/or length of sufficient dimension to accommodate scanning of document 16 while document 16 remains substantially stationary and photosensitive assembly 30 moves linearly along rail 38.

Referring to FIG. 1, in operation, light radiated from light source 34 passes through platen 44 and ADF 14 window 52 and impinges against front surface 16A of document 16. Light reflected from the portion of document 16 exposed through ADF 14 window 52 passes through ADF 14 window 52 and platen 44 and thereafter is collected by lens assembly 40 and focused on photosensitive element 42. Briefly, as is described in greater detail below, ADF 14 comprises a duplex detection assembly 70 for generating and directing light toward a back surface 16B of document 16 and directing the light reflected from back surface 16B of document 16 toward scanning device 12 for receipt by photosensitive element 42 of scanning device 12 from which a determination is made whether an image resides on back surface 16B of document 16. Thus, embodiments of the present invention enable detection of an image residing on back surface 16B of document 16 without changing an orientation of document 16 (i.e., image detection on back surface 16B of document 16 while front surface 16A of document 16 is oriented toward photosensitive 42 of scanning device 12).

Figures 3A, 3B:
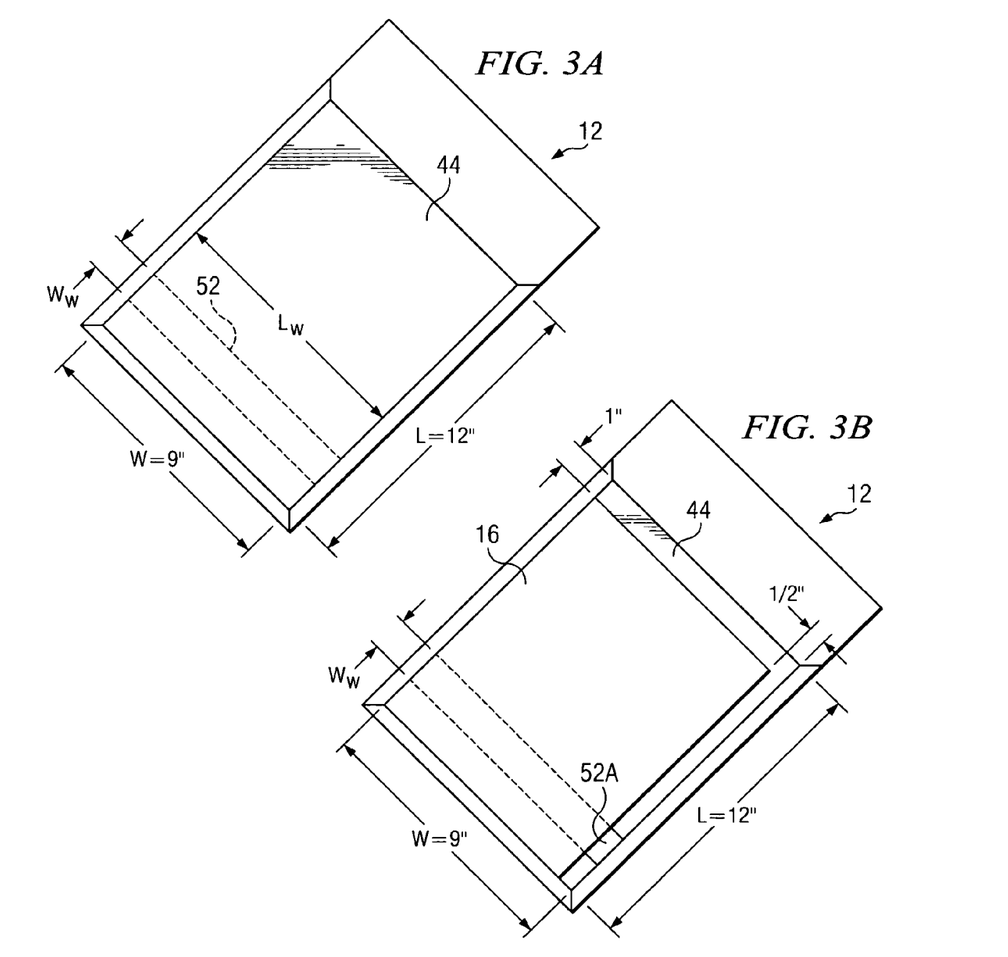
FIG. 3A is a diagram illustrating an embodiment of a window of the automatic document feeder illustrated in FIG. 1 illustratively transposed onto a platen of a scanning device of the duplex detection imaging system illustrated in FIG. 1.
FIG. 3B is a diagram illustrating a document positioned on the scanning device platen illustrated in FIG. 3A.

FIG. 3A is a diagram illustrating window 52 of ADF 14 illustratively transposed onto platen 44 of scanning device 12 (denoted with dashed lines). A scan region in which a narrow strip of document 16 is imaged is constrained by the placement of ADF 14 onto platen 44 and provides an area of platen 44 through which imaging data is obtained. Scan lines are generated by sampling light that is passed through ADF 14 window 52. As illustrated in FIG. 3A, the scan region has a width as defined by ADF 14 window 52 width ($W_w$) and length (Lw). In the illustrative example, and not by way of limitation, platen 44 has a width (W) of nine inches and a length (L) of twelve inches. Preferably, ADF 14 has a width substantially equivalent to the width of platen 44. However, it should be understood that the widths of platen 44 and ADF 14 may vary.

Generally, platen 44 is sized having a width and length such that scanning device 12 is used to scan document(s) 16 having dimensions less than the dimensions of platen 44. For example, as illustrated in FIG. 3B, but not by way of limitation, an 8½×11 inch document 16 is illustrated as being positioned over platen 44. A portion 16C of document 16 is positioned in the scan region as defined by window 52. Because document 16 has a width dimension less than that of ADF 14 window 52, a portion 52A of window 52 is generally unobstructed by document 16. In the present example, unobstructed portion 52A has a dimension of ½"×$W_w$ inches. Embodiments of the present invention advantageously exploit the occurrence of portion 52A of window 52 during automated document feeding by backlighting the document 16 and generating one or more image samples of back surface 16B of document 16 by directing the light reflected from back surface 16B of document 16 through the unobstructed portion 52A of window 50 to photosensitive element 42 of scanning device 12. Results of the image sample taken from the back surface 16B of document 16 are submitted to a statistical analysis application (or another suitable technique) and a determination of whether image content is present on the back surface 16B of document 16 is made. In some embodiments of the present invention, if image content is detected on the back surface 16B of the document 16, duplex scanning is automatically performed without further user intervention. However, it should be understood that in other embodiments of the present invention, system 10 may be configured to notify and/or prompt a user to manually flip and/or reverse feed document 16 upon a determination that an image resides on both surfaces of document 16.

Figure 4A:
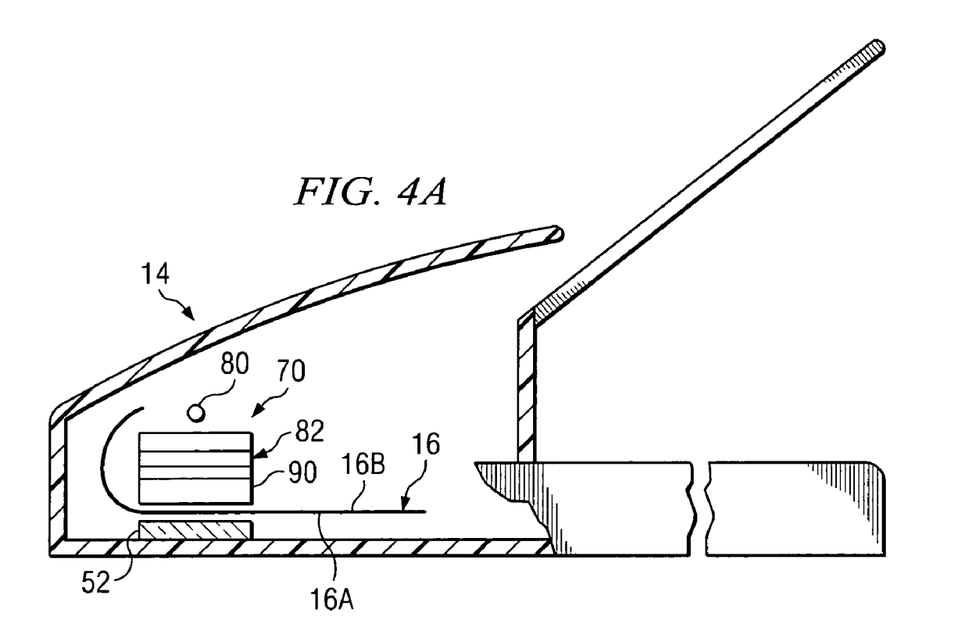
FIGS. 4A and 4B are diagrams illustrating a side-sectional view and a front-sectional view, respectively, of an embodiment of an automatic document feeder of the duplex detection imaging system illustrated in FIG. 1 in accordance with the present invention.
Figure 4B:
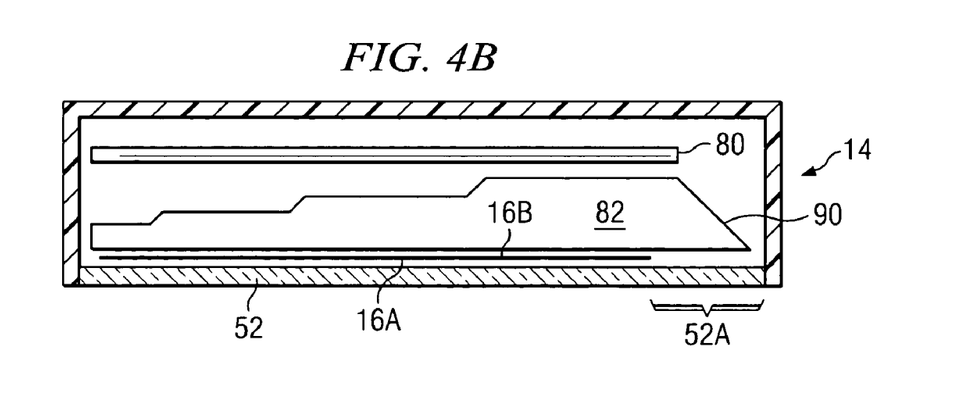

FIGS. 4A and 4B are diagrams illustrating a side-sectional view and a front-sectional view, respectively, of an embodiment of duplex detection assembly 70 of ADF 14 in accordance with the present invention. In the embodiment illustrated in FIGS. 4A and 4B, duplex detection assembly 70 comprises a light source 80 for illuminating back surface 16B of document 16 and a reflective assembly 82 for directing the light reflected from back surface 16B of document 16 toward scanning device 12 and photosensitive element 42. In the embodiment illustrated in FIGS. 4A and 4B, reflective assembly 82 comprises a light pipe 90 preferably constructed from injection molded plastic although other structures may be substituted therefore. However, it should be understood that other devices may also be used to direct the light reflected from back surface 16B of document 16 toward scanning device 12 and photosensitive element 42.

In operation, light source 80 directs light onto back surface 16B of document 16. Light reflected from back surface 16B is collected and re-directed by reflective assembly 82. In the embodiment illustrated in FIGS. 4A and 4B, light collected by reflective assembly 82 is re-directed to window portion 52A, as best illustrated in FIG. 4B, unobstructed by document 16. However, it should be understood that light collected by reflective assembly 82 may be otherwise directed from ADF 14 toward scanning device 12 and photosensitive element 42. For example, and not by way of limitation, optical cable fibers or other devices may be used to direct light collected by reflective assembly 82 toward scanning device 12 and photosensitive element 42.

In the embodiment illustrated in FIGS. 4A and 4B, reflective assembly 82 comprises a mirror assembly for re-directing light incident on one or more mirror surfaces. Thus, by illuminating and sampling back surface 16B as document 16 is driven past window 52, image samples from different locations on back surface 16B are obtained. A comparison between different image samples obtained from back surface 16B by way of one or more numerous statistical analysis techniques is used to detect whether image content resides on back surface 16B.

Figure 5A:
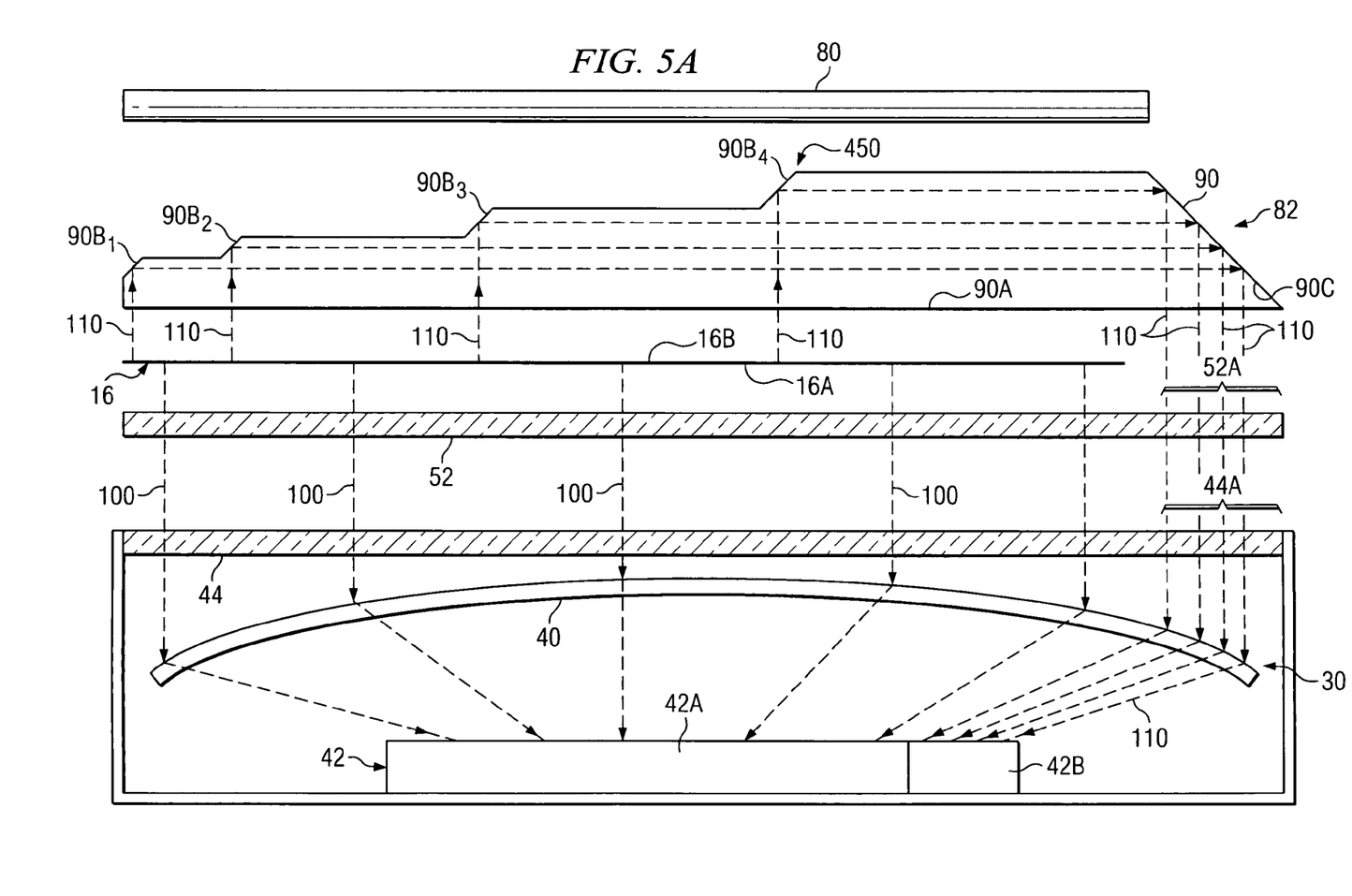
FIGS. 5A and 5B are diagrams illustrating a front view and a side view, respectively, of the automatic document feeder illustrated in FIGS. 7A and 7B.
Figure 5B:
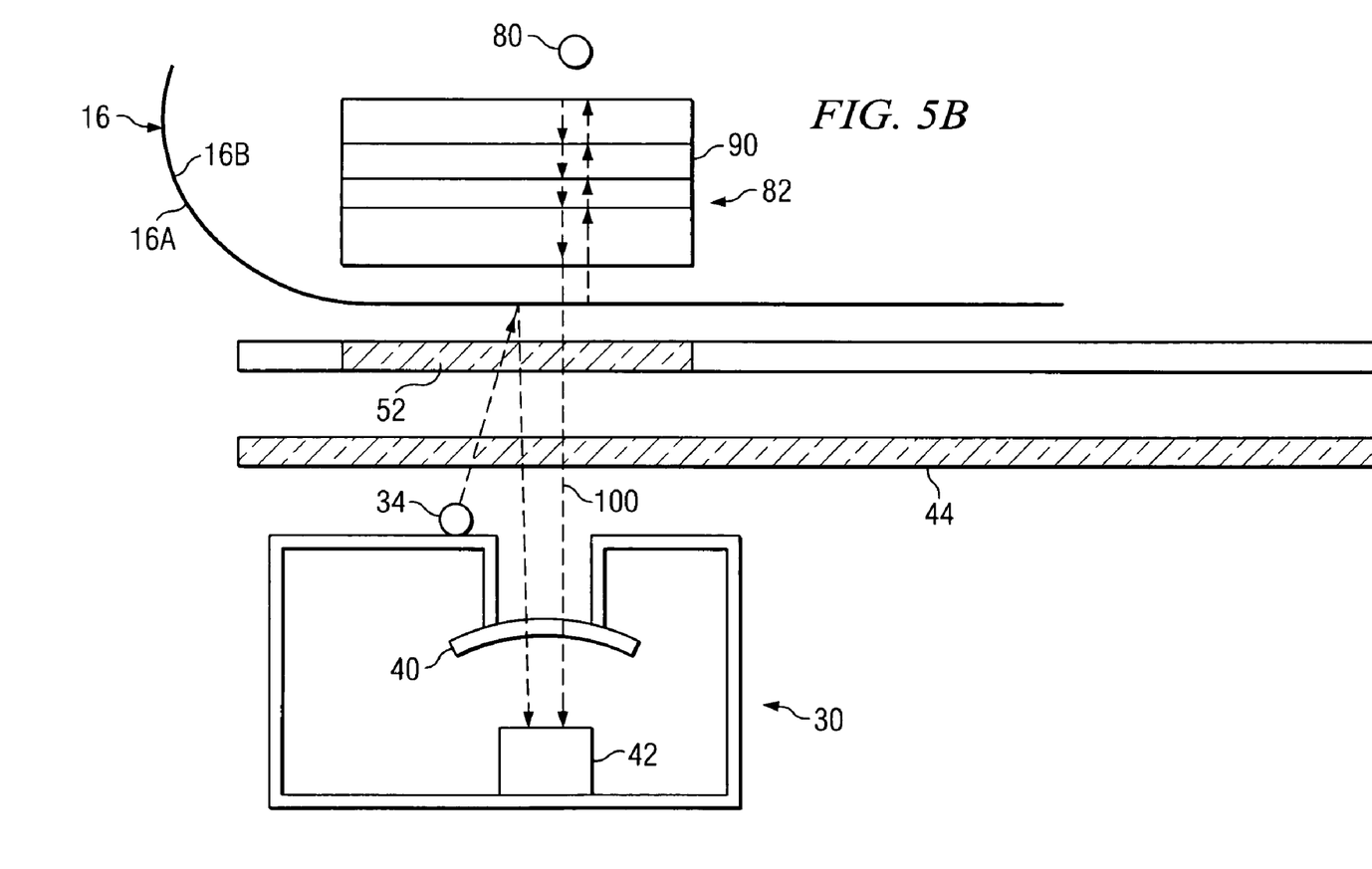

FIGS. 5A and 5B are diagrams illustrating a front view and a side view, respectively, of reflective light patterns using system 10 in accordance with the present invention. In operation, light is directed onto front surface 16A by light source 34 and light 100 reflected therefrom impinges lens assembly 40. Lens assembly 40 focuses reflected light 100 onto photosensitive element 42, and photosensitive element 42 receives the reflected light 100 and converts it into electronic signals representative of the current scan line being imaged on front surface 16A.

Light source 80 disposed within ADF 14 is activated and directs light onto back surface 16B. Light 110 reflected from back surface 16B impinges and passes through surface 90A of light pipe 90. Light pipe 90 re-directs the reflected light 110 out of ADF 14 towards scanning device 12 and onto lens assembly 40 via window portion 52A, where it is directed and focused onto photosensitive element 42. In the illustrative embodiment, light 110 reflected from back surface 16B is directed out of ADF 14 by way of one or more reflective surfaces $90B_1$-$90B_4$ of light pipe 90. Reflected light 110 reflected by surfaces $90B_1$-$90B_4$ then impinges a reflective light pipe surface 90C aligned with unobstructed portion 52A of window 52. Reflected light 110 then passes through unobstructed portion 44A of platen 44, impinges lens assembly 40, and is focused onto photosensitive element 42. In a preferred embodiment, light 100 reflected from front surface 16A is directed onto a portion 42A of photosensitive element 42 and light 110 reflected from back surface 16B is directed onto a portion 42B of photosensitive element 42. By directing light 100 and 110 to different portions of photosensitive element 42, electrical signals corresponding to light 100 and 110 may be readily distinguished such that electric signals corresponding to back surface 16B may be readily subjected to a suitable statistical analysis algorithm to determine whether an image resides on back surface 16B.

As document 16 is driven across window 52, a plurality of samples of different sections of back surface 16B are generated. Preferably, front surface 16A is imaged concurrently with sampling of back surface 16B during a first scanning procedure of the front surface 16A. Each image sample, or scan line, generated from back surface 16B comprises a plurality of pixel values. In the event that no content is present on back surface 16B, the statistical analysis of the various samples taken on back surface 16B will not vary, or vary only slightly, thereby indicating that no image content is present on back surface 16B and scanning of document 16 is processed according to a simplex, or single side, mode. However, variations in pixel values greater than a predefined threshold indicate changes in pixels of different scan lines indicative of image content on back surface 16B, and processing of scanned document 16 is then made in accordance with an automated duplex mode. That is, in the event that image content is detected on back surface 16B, the document 16 orientation is automatically reversed (upon completion of scanning front surface 16A) and the document 16 is driven past window 52 to enable scanning of back surface 16B by scanning device 12.

Thus, embodiments of the present invention reduce the complexity and costs associated with previous duplex detection systems by utilizing the photosensitive device used to scan one side of a document to determine whether image content resides on an opposite side of the document without first turning or flipping the document. For example, light reflected from back surface 16B of document 16 is directed out of ADF 14 and onto the photosensitive element 42 used to scan front surface 16A of document 16 to automatically determine whether image content resides on back surface 16B. Thus, embodiments of the present invention enable image detection from back surface 16B of document 16 without changing an orientation of document 16 relative to photosensitive element 42 (i.e., image detection on back surface 16B of document 16 while front surface 16A of document 16 remains oriented toward photosensitive element 42).

What is claimed is:

1. A duplex detection imaging system, comprising:
    a scanning device having a photosensitive element disposed therein for receiving light reflected from a front surface of a document, the photosensitive element adapted to receive light reflected from a back surface of the document, while the front surface of the document faces toward a surface of the photosensitive element that is configured to receive light reflected from the front and back surfaces of the document, for determining whether an image resides on the back surface of the document;
    a first light source located on a first side of a platen of the scanning device and configured to illuminate the front surface of the document for generating the light reflected from the front surface of the document; and
    a second light source located on a second side of the platen and configured to illuminate the back surface of the document for generating the light reflected from the back surface of the document.

2. The system of claim 1, wherein the light reflected from the back surface of the document is received by the photosensitive element via a portion of the platen of the scanning device.

3. The system of claim 1, further comprising a reflective assembly adapted to direct the light reflected from the back surface of the document to the scanning device.

4. The system of claim 1, wherein the first light source and the photosensitive element are disposed on a carriage of the scanning device, the carriage adapted to impart motion, relative to the platen, to the first light source and the photosensitive element.

5. The system of claim 1, further comprising a light pipe adapted to direct the light reflected from the back surface of the document toward the photosensitive element.

6. The system of claim 1, further comprising an automatic document feeder adapted to direct the light reflected from the back surface of the document toward the photosensitive element.

7. The system of claim 6, wherein the automatic document feeder is adapted to direct the light reflected from the back surface of the document toward the photosensitive element via an unobstructed portion of a window of the automatic document feeder.

8. The system of claim 6, wherein a light pipe of the automatic document feeder is adapted to receive the light reflected from the back surface of the document at a first direction and is adapted to direct the light reflected from the back surface of the document toward the photosensitive element at a second direction that is opposite the first direction.

9. The system of claim 1, wherein the scanning device comprises a lens assembly adapted to focus the light reflected from the front surface and the back surface of the document onto the photosensitive element.

10. The system of claim 1, further comprising an automatic document feeder having a window sized to direct therethrough to the photosensitive element the light reflected from the back surface of the document.

11. The system of claim 1, wherein the scanning device comprises at least one of the group consisting of a scanner, a copier, a printer and a facsimile device.

12. The system of claim 1, wherein the first light source and the second light source are configured to respectively illuminate the front surface and the back surface of the document concurrently.

13. A method for operating a duplex detection imaging system, comprising:
    directing light from a first light source of a scanning device onto a front surface of a document;
    reflecting the light from the first light source from the front surface of the document onto a photosensitive element of the scanning device;
    directing light from a second light source of an automatic document feeder onto a back surface of the document concurrently with directing the light from the first light source onto the front surface of the document; and
    reflecting the light from the second light source from the back surface of the document onto the photosensitive element of the scanning device while the front surface of the document is oriented toward the photosensitive element to determine whether an image resides on the back surface of the document.

14. The method of claim 13, further comprising directing the light reflected from the back surface of the document toward the photosensitive element via a portion of a window of the automatic document feeder.

15. The method of claim 13, wherein receiving the light reflected from the back surface of the document comprises receiving the light reflected from the back surface of the document via a portion of a platen of the scanning device.

16. The method of claim 13, further comprising directing the light reflected from the back surface of the document toward the photosensitive element via a reflective assembly.

17. The method of claim 13, further comprising directing the light reflected from the front surface of the document to a portion of the photosensitive element.

18. The method of claim 17, further comprising directing the light reflected from the back surface of the document to another portion of the photosensitive element.

19. The method of claim 18, wherein the light reflected from the front surface of the document and the light reflected from the back surface of the document are respectively concurrently directed onto the portion of the photosensitive element and the another portion of the photosensitive element.

20. The method of claim 13, further comprising directing the light reflected from the back surface of the document toward the photosensitive element via a light pipe.

21. The method of claim 20, wherein the light pipe receives the light reflected from the back surface of the document at a first direction and directs the light reflected from the back surface of the document toward the photosensitive element at a second direction that is opposite the first direction.

22. A duplex detection imaging system, comprising:
    means for directing light from a first light source of a scanning device onto a front surface of a document
    means for reflecting the light from the first light source from the front surface of the document onto a photosensitive element of the scanning device;
    means for directing light from a second light source of an automatic document feeder onto a back surface of the document concurrently with directing the light from the first light source onto the front surface of the document; and
    means for reflecting the light from the second light source from the back surface of the document onto the photosensitive element of the scanning device while the front surface of the document is oriented toward the photosensitive element to determine whether an image resides on the back surface of the document.

23. The system of claim 22, further comprising means for directing the light reflected from the back surface of the document toward the photosensitive element.

24. The system of claim 22, further comprising means for concurrently directing the light reflected from the front and back surfaces of the document respectively to different portions of the photosensitive element.

25. The system of claim 22, further comprising means for directing the light reflected from the back surface of the document toward the photosensitive element through a portion of a platen of the scanning device.

26. The system of claim 22, further comprising means for directing the light reflected from the back surface of the document toward the photosensitive element via a window of an automatic document feeder.

27. An imaging system, comprising:
    a scanning device, comprising:
        a first light source adapted to illuminate a front surface of a document; and
        a photosensitive element; and
    an automatic document feeder, comprising:
        at least one roller adapted to orient the front surface of the document toward the scanning device to enable light to be received at the front surface of the document from the first light source of the scanning element and to enable that light to be reflected from the front surface of the document and to be received by the photosensitive element of the scanning device;
        a second light source adapted to illuminate a back surface of the document; and
        a reflective assembly adapted to direct light, received at the back surface of the document from the second light source and reflected from the back surface of the document, toward the photosensitive element of the scanning devices while the front surface of the document faces toward a surface of the photosensitive element that is configured to receive light reflected from the front and back surfaces of the document, to determine whether an image resides on the back surface of the document.

28. The imaging system of claim 27, wherein the reflective assembly comprises a light pipe.

29. The imaging system of claim 27, wherein the scanning device further comprises a movable carriage, wherein the first light source and the photosensitive element are disposed on the movable carriage.

30. The imaging system of claim 27, further comprising a window sized to direct the light reflected from the back surface of the document therethrough to the scanning device.

31. The imaging system of claim 27, further comprising a reflective assembly adapted to direct the light reflected from the back surface of the document toward the scanning device via an unobstructed portion of a window disposed toward the scanning device.

32. The imaging system of claim 27, further comprising a reflective assembly adapted to direct the light reflected from the back surface of the document toward the scanning device via a portion of a platen of the scanning device.

33. The imaging system of claim 27, wherein the first light source and the second light source are configured to respectively illuminate the front surface and the back surface of the document concurrently.

* * * * *

UNITED STATES PATENT AND TRADEMARK OFFICE
CERTIFICATE OF CORRECTION

| | | |
|---|---|---|
| PATENT NO. | : 7,652,801 B2 | Page 1 of 1 |
| APPLICATION NO. | : 10/860202 | |
| DATED | : January 26, 2010 | |
| INVENTOR(S) | : William Robert Haas et al. | |

It is certified that error appears in the above-identified patent and that said Letters Patent is hereby corrected as shown below:

In column 8, line 62, in Claim 27, delete "devices" and insert -- device, --, therefor.

Signed and Sealed this

Sixth Day of July, 2010

David J. Kappos
*Director of the United States Patent and Trademark Office*